United States Patent
Michael et al.

(10) Patent No.: US 6,173,070 B1
(45) Date of Patent: Jan. 9, 2001

(54) MACHINE VISION METHOD USING SEARCH MODELS TO FIND FEATURES IN THREE DIMENSIONAL IMAGES

(75) Inventors: David J. Michael, Framingham; Aaron S. Wallack, Natick, both of MA (US)

(73) Assignee: Cognex Corporation, Natick, MA (US)

( * ) Notice: Under 35 U.S.C. 154(b), the term of this patent shall be extended for 0 days.

(21) Appl. No.: 09/000,583

(22) Filed: Dec. 30, 1997

(51) Int. Cl.[7] .............................. G06K 9/00; G01B 11/24
(52) U.S. Cl. .......................... 382/145; 382/154; 364/582
(58) Field of Search .................................. 382/141, 142, 382/144–154, 325, 285–287, 291; 364/582, 491, 560; 348/87, 126

(56) References Cited

U.S. PATENT DOCUMENTS

| 4,677,473 | * | 6/1987 | Okamoto et al. ..................... 382/141 |
| 5,550,763 |   | 8/1996 | Michael et al. ...................... 364/582 |
| 5,642,158 | * | 6/1997 | Petry, III et al. .................... 382/146 |

OTHER PUBLICATIONS

B. Horn, Robot Vision, MIT Press, pp. 334–364 (1984).
Cognex Corp., Machine Vision Systems Technical Description pp. 3–7 to 3–17, 3–43 to 3–45 (1992) 15 Crawford Street, Needham, MA.

* cited by examiner

Primary Examiner—Jose L. Couso
Assistant Examiner—Duy M. Dang
(74) Attorney, Agent, or Firm—Brian L. Michaelis

(57) ABSTRACT

A system and method for analyzing 3D captured image data of scanned surfaces to locate object of interest, such as solder balls. A 3D model is created of an object of interest, the 3D model including weighted "don't care" areas where a match is not required. The 3D models which are used include geometric shapes, including a frustum, and models created from actual 3D image data of real objects. The 3D captured image data is processed to locate objects matching the 3D models, including processing by normalized correlation. Once the objects are located, the system selects data points within the 3D captured image data that are a predetermined distance away from the located objects. These data points are analyzed to determine a surface plane which fits the selected data points, thereby locating the surface in the 3D capture image data.

27 Claims, 7 Drawing Sheets

| 60 | | | | | |
|---|---|---|---|---|---|
| 0 | 0 | 0 | 0 | 0 | 0 |
| 0 | 10 | 10 | 10 | 10 | 0 |
| 0 | 10 | 10 | 10 | 10 | 0 |
| 0 | 10 | 10 | 10 | 10 | 0 |
| 0 | 10 | 10 | 10 | 10 | 0 |
| 0 | 0 | 0 | 0 | 0 | 0 |

CORRELATION MODEL

FIG. 6

| 62 | | | | | |
|---|---|---|---|---|---|
| 1 | 1 | 0 | 0 | 1 | 1 |
| 1 | 0 | 1 | 1 | 0 | 1 |
| 0 | 1 | 1 | 1 | 1 | 0 |
| 0 | 1 | 1 | 1 | 1 | 0 |
| 1 | 0 | 1 | 1 | 0 | 1 |
| 1 | 1 | 0 | 0 | 1 | 1 |

CORRELATION WEIGHTS(MASK)

FIG. 7

MACHINE VISION METHOD USING SEARCH MODELS TO FIND FEATURES IN THREE DIMENSIONAL IMAGES

FIELD OF THE INVENTION

The present invention relates to locating and inspecting features on an object, and more particularly to automatically locating and inspecting features on electronic components.

BACKGROUND OF THE INVENTION

Machine vision systems are frequently used in contexts that require the system to capture a two dimensional image of a physical object and locate within that image some aspects or features that are to be analyzed, such as to determine the position of the features, inspect the integrity of the feature, or effect alignment or a particular orientation of the physical object based on the features found.

For example, U.S. Pat. No. 5,550,763 ("the '763 patent") describes a method and apparatus for automatically locating the center of a ball bond, in a digitized two dimensional binary or grey-scale image of the ball bond formed on a bonded semiconductor pad. The '763 patent works with a two-dimensional grey-scale image representation, and constructs a flattened synthetic cone-shaped model which is used to produce a two-dimensional grey-scale image model. The grey-scale image model is used for a normalized correlation search in the area of the image at the nominal or expected location of the ball bond. The normalized correlation search, which is well known in the art, measures the similarity between a captured image of the ball bond and the synthetic grey-scale image model independent of linear differences in the image or model brightness. That is, the normalized correlation search effects a template matching, scanning the captured input image for a match to the synthetic image model to determine how closely the model matches, i.e. correlates to, the found object, with a high degree of tolerance for optical issues such as poor focus and poor lighting. The search results yield a correlation coefficient indicating the extent to which the image matches the model, and an X, Y location in the image indicating the center of the found matching object.

Disadvantageously, the '763 patent uses a two-dimensional grey-level image data set both as input and for the image model, which limits the inspection process to inspection of the desired feature only in terms of visually discernable artifacts as viewed by reflected light. Features that have a height or depth, i.e. a third dimension, are impossible to inspect with the disclosed process. The '763 patent can not discern any surface features other than by differing reflectance of light off the surface of the device. Any measurements and inspection based on spatial characteristics, such as volume, are impossible. In short, the method and apparatus disclosed in the '763 patent has no utility in three dimensional inspection applications.

Methods have been proposed for using machine vision systems to determine characteristics of three dimensional objects in a single pass. One proposed method implements a machine vision process that interprets "height images" to provide information that permits three-dimensional objects, such as solder bumps, to be distinguished from two-dimensional objects, such as solder pads. Spatial characteristics of a selected object in a "height image", that has pixel values representative of heights of corresponding portions of the selected object, are determined by a process that first determines a height for each of a plurality of portions of the object. A volume of the object above a selected height, i.e. threshold, is determined by summing a count representing the cross-sectional area of the object at the selected height and a count representing the volume at each of the plurality of portions of the object above the selected height.

This proposed methodology for determining the volume of an object as a function of three-dimensional (i.e. height) data effectively determines a center of mass of the object above the particular threshold (i.e. selected height). The methodology sets a threshold with respect to a particular base height of an object, uses vision tools that effect a contour plot or connectivity of points in the image to identify the object, and then merely looks for groups of points above the base height of the two-dimensional contour.

Such an implementation is of questionable accuracy when there is any tilt of the plane above which the base height is defined, or when the base height is indeterminate. The threshold height is constant and does not accommodate tilting of the plane on which the objects are positioned, so that volumes that appear below the base height as a result of tilt will not be determined. When the base plane height is indeterminate, volumes that appear below the incorrectly assumed base height will not be determined. The previous methodology does not process the three-dimensional data set in a manner that considers asymmetry of the object(s) in that the vision tools used yield only information relating to the center of mass of the object above the threshold. It does not take advantage or use all the information in the three-dimensional data set input in that information below the base height is effectively ignored. This disadvantageously leads to less accurate inspection of three dimensional objects.

This previous methodology is also more susceptible to inaccuracies and errors resulting from noise spikes in that it relies heavily on information associated with areas of the object that are most noisy. Inspection of an object in three dimensions inherently involves significant amounts of noise in the captured image data, due to the manner in which 3D data is ascertained and typically resulting from issues associated with optics and lighting in real world conditions. Furthermore, many 3D sensors and image acquisition devices produce merit scores (x,y) for each z(x,y) measurement, and the previous methodology ignores such merit scores. For example, reflections and shading on the sides of objects may show up in the height image data set as noise spikes (with low merit scores). In merely establishing a threshold above which groups are analyzed, according to this prior method, there is no mechanism for tolerating and/or discounting noise spikes that exceed the selected base threshold. Accordingly, this prior method is relatively slow and inaccurate.

SUMMARY OF THE INVENTION

The present invention provides a robust method and apparatus for inspecting three-dimensional objects, represented as a captured three-dimensional image data set, via a normalized correlation search implementation which considers asymmetry of the object(s) and accommodates for tilt in the plane in which the objects are disposed.

According to the invention, a three-dimensional (3D) synthetic model of an object of interest, such as a solder ball, is constructed in a manner that facilitates discounting of areas of the object that are highly susceptible to noise. The 3D synthetic model is subjected to a mask that is derived in order to discount high noise areas as a function of the shape of the object of interest and the context of the object inspection, to provide a masked 3D model. The masked 3D model and a captured 3D image data set of the object of interest are processed via normalized correlation processing to provide an indication of location of the object of interest in the captured 3D image and a correlation coefficient indicative of the degree to which a found object of interest correlates to the synthesized 3D model.

In further accord with the invention, points proximate to the object of interest are sampled and a common two dimensional plane, surface or contour is fit on which the points lie in the 3D image data set. Accordingly, a location of a surface in the 3D captured image upon which the object of interest lies is determined and can be used for further inspection and/or processing, for instance to ascertain planarity of the surface, to inspect the condition of the surface or the like.

Features of the invention include provision of a location and inspection implementation for 3D captured image data that uses an optimized synthesized 3D model to enhance the speed of processing and the accuracy of the inspection process. 3D captured image data sets are processed according to an inspection methodology that is relatively insensitive to noise as noise/error prone areas in the model are discounted and/or completely masked. Area based measurement or correlation provides a robust inspection that utilizes greater amounts of the information in the captured 3D data set, yet does not rely on areas that are likely to contain noise.

Other features of the invention include the ability to handle and process image data when the base plane height is not known beforehand. Further, bumps or other objects in the data can be classified or ranked by qualities such as "bumpiness", rather than by area or volume. The invention also allows local neighborhood matching, instead of requiring analysis of the entire image. This feature means that bumps can be located even if there are multiple levels of bases on the object, instead of a single common ground plane. A plane/quadric does not need to be fitted to the entire surface, plane/quadrics can be locally fitted to areas around each bump, group of bumps, or object of interest. Other aspects of the invention include the ability to utilize merit scores provided by the 3D sensor.

This method also includes a method to compute height, volume and center of mass measurements by using the height differences between the measured height and the fitted ground plane and/or the merit scores at each pixel.

DESCRIPTION OF THE DRAWINGS

The foregoing and other features and advantages of the present invention will be more fully understood from the following detailed description of illustrative embodiments, taken in conjunction with the accompanying drawings, in which:

FIG. 6 shows sample data for use as a correlation model for one embodiment of the present invention;

FIG. 7 shows sample data for correlation weights corresponding to the sample data shown in FIG. 6;

DETAILED DESCRIPTION

The present invention for locating and inspecting objects on the surface of a device using 3D (three dimensional) data is illustratively implemented in the context of electronic component handling systems. In fabricating electronic assemblies, surface mountable components, such as ball grid array (BGA) devices, must be inspected for proper uniformity and quality of the surface objects, such as solder balls. The solder balls on the BGA device constitute terminals which are accurately positioned on corresponding pads on a printed circuit board (PCB). Heat is then applied to the PCB to cause the solder balls on the BGA devices to melt and form electrical connections. Non-uniform, e.g. malformed or missing, solder balls will present problems in the manufacture of electronic sub-assemblies. Accordingly, it is desirable to effect inspection of such devices prior to or during the manufacturing process.

Figure 1:
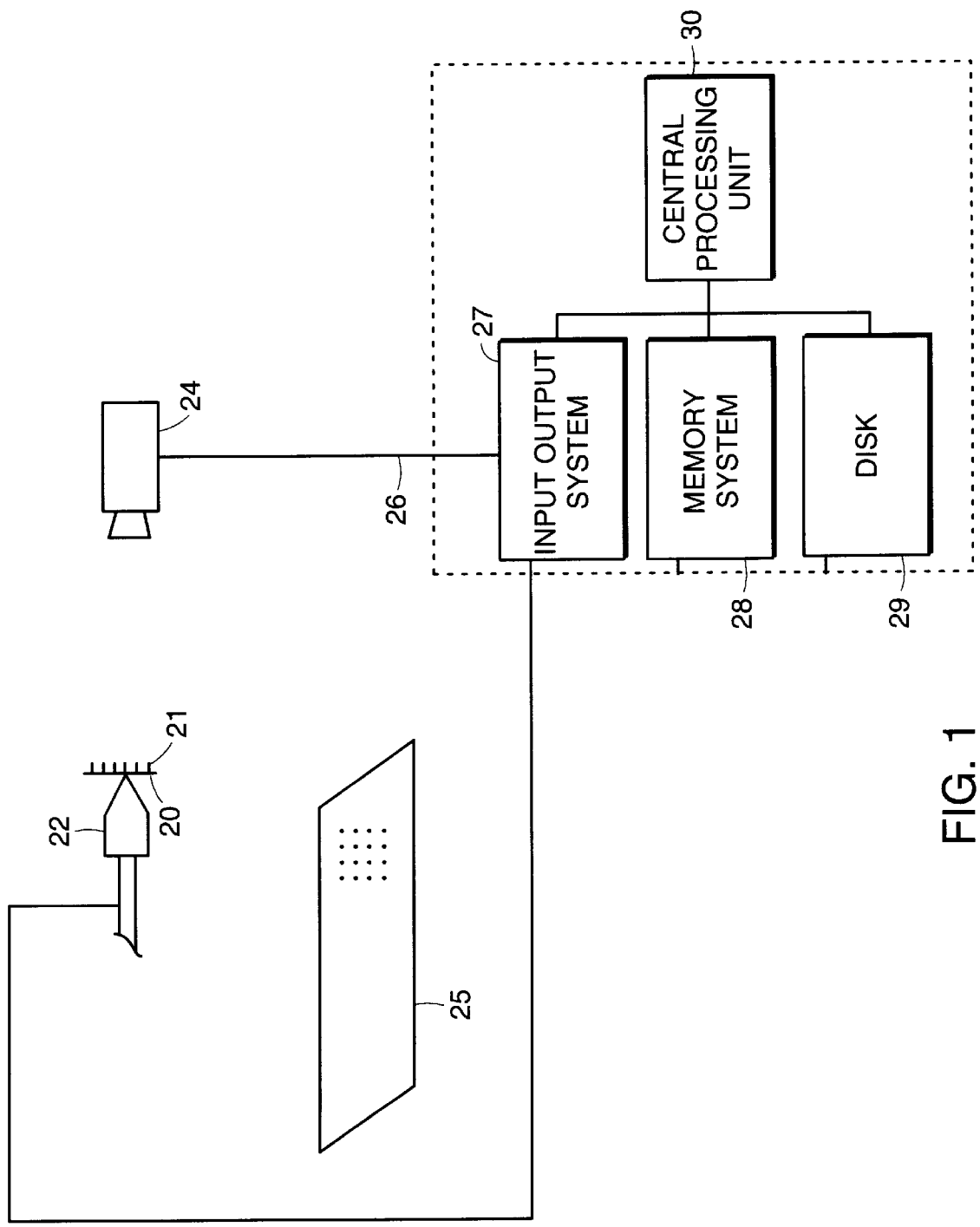
FIG. 1 depicts an illustrative system for obtaining image data for practicing the present invention.

A system for obtaining 3D data for object inspection is generally illustrated in FIG. 1. The devices for inspection 20 which include objects 21 are positioned to be inspected by an image acquisition device 24, such as a 3D camera or a confocal microscope. The inspection device 20 can be positioned for example by a robotic manipulator arm 22, which picks up the inspection device 20 from a surface 25. Alternatively, the image acquisition device 24 may be aimed down towards an inspection device 20 positioned on a horizontal surface (not shown). The horizontal surface includes a conveyor belt which moves the inspection devices 20 under the image acquisition device 24 for inspection. Alternatively the image acquisition device 24 may move while the inspection devices 20 are stationary.

The image acquisition device 24 images the surface of the inspection device 20 and produces 3D image data, which is distinct from 2D grey scale image data. The image acquisition device 24 can use any of various techniques to scan and produce the image data, including Ultrasonic, Infrared, light interferometer, and other non-contact and contact methods. In this illustrative embodiment the image acquisition device 24 is a NewView 200 3D Imaging Surface Structure analyzer produced by Zygo Inc. of Middlefield, Conn. The NewView 200 is a scanning White Light Interferometer capable of examining surface details down to 0.1 nanometer height resolution, and producing a 3D image data set ("image data") for processing according to the invention. The NewView 200 includes a built-in light source, and requires no external lighting for scanning.

The image data 26 is stored in a storage memory 28, including temporary storage such as RAM or a more permanent storage 29 including magnetic or optical disks, or magnetic tape. The image data 26 is preferably in the form of a two-dimensional array of data points indicating surface height at each data point in the array. Surface height is the height above a certain reference point, or alternatively, the distance from the object to the image acquisition device 24. The image data 26 can also include merit scores for each data point indicating a "confidence" in the accuracy of the corresponding data point, as provided by the image acquisition device 24.

The image data 26 is analyzed by an image analyzer 30, which in this illustrative embodiment is any computer system capable of analyzing data, including microprocessor based personal computers, specialized array parallel processors and SIMD (single instruction, multi-data) systems.

Figure 2:
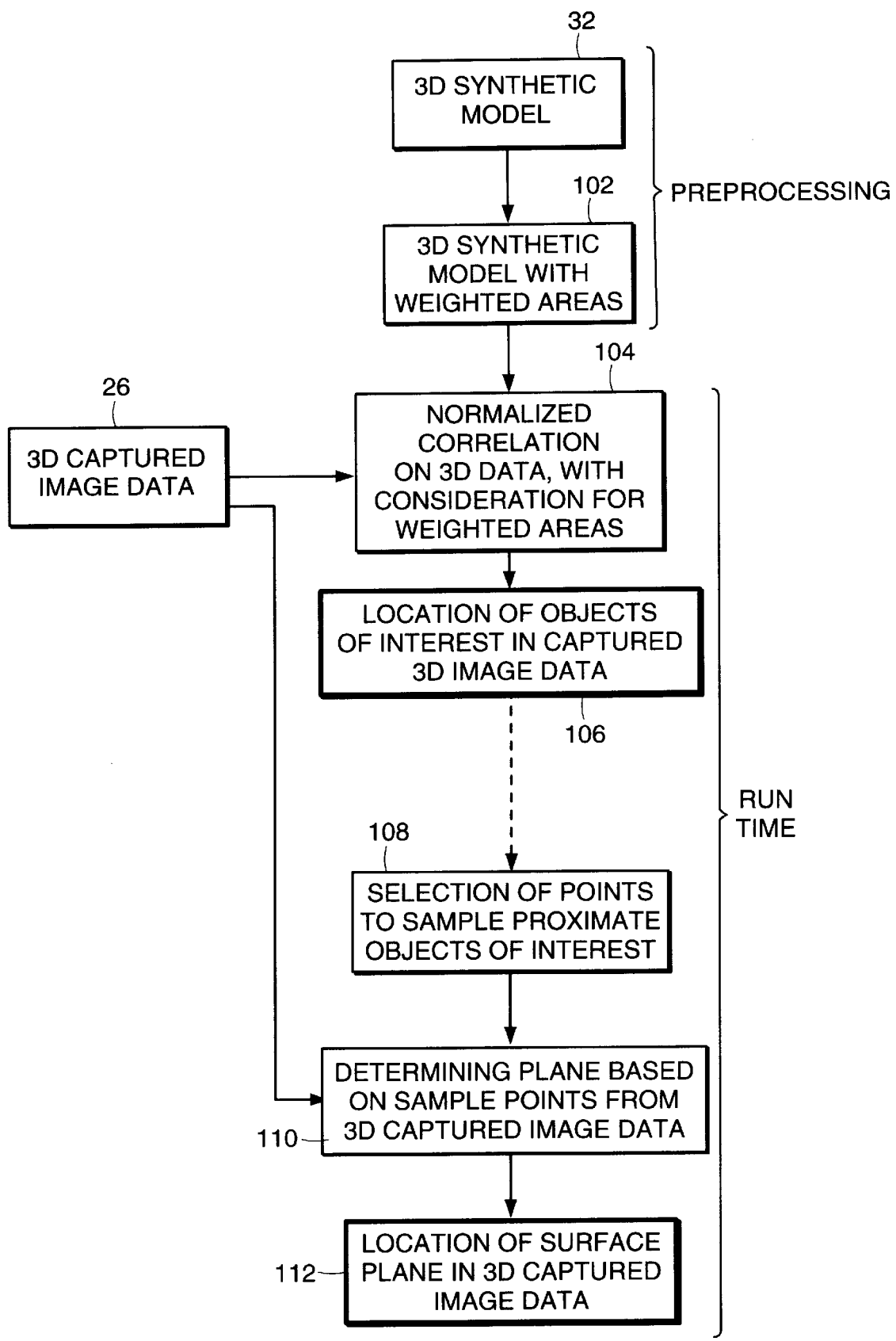
FIG. 2 is a flow diagram generally depicting how weighted 3D Synthetic Models are compared with 3D Captured Image Data to locate and analyze objects of interest in the 3D Captured Image Data according to the present invention.

The general system and method of the present invention is illustrated in FIG. 2. A predefined synthetic model 32 is generated, which is generally similar in shape to the objects of interest 21 to be located in the 3D captured image data 26. This predefined synthetic model 32 is then further processed and analyzed to include weighted areas of interest, such as areas of the predefined synthetic model 32 which are considered "don't care", in that those areas will be disregarded when compared to 3D captured image data 26.

At run time, the 3D captured image data 26 is searched for the predefined synthetic model 102, using comparison techniques including normalized correlation, as shown by label 104. The result of this comparison is location data 106 indicating the location of the object(s) 21 in the 3D captured image data 26. This location data 106 may be in an appropriate form, including X, Y and Z location; X and Y location; indexes into the 3D captured image data; etc. The location data may be the center of the object 21, or a border surrounding the object 21. Further other data may be returned, including one or more normalized correlation coefficients indicating the accuracy of the match. This location data 106 is then output to a user, or used for further processing, which includes analysis of the objects of interest 21.

Additional processing according to one embodiment of the present invention includes determining a surface plane of the inspection object 20 in the 3D captured image data 26. This is performed by selecting points to sample around the objects of interest 21, as shown by label 108. The points are sampled from the 3D captured image data 26, and a plane or other surface shape is determined based on calculations with those sample points, as shown by label 110. The result is data indicating a 2D surface plane location 112 in the 3D captured image data 26. As an example, in a system for analyzing solder balls on a BGA, the objects of interest 21 will be the solder balls, as determined by analyzing the 3D captured image data 26, and the 2D surface plane location 112 is the surface of the BGA (inspection device 20), which may be at some angle or positioning other than perfectly flat.

Figure 3A:
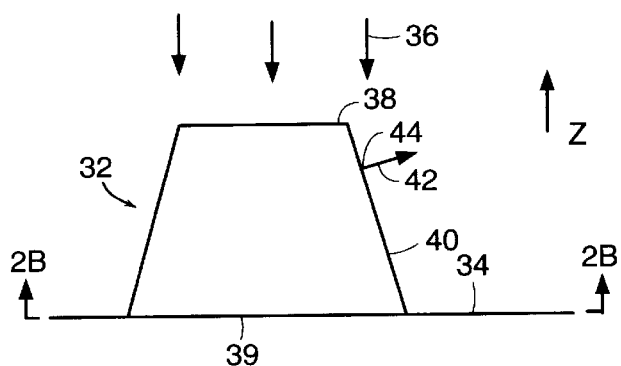
FIG. 3 is a view of a synthesized model of an object of interest according to one embodiment of the present invention.
Figure 3B:
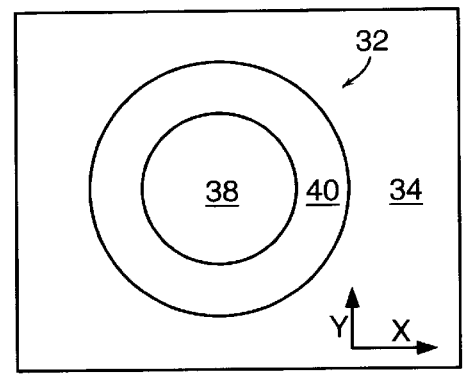
Figure 4A:
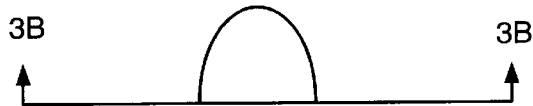
FIG. 4 is a view of a different synthesized model of an object of interest according to one embodiment of the present invention.
Figure 4B:
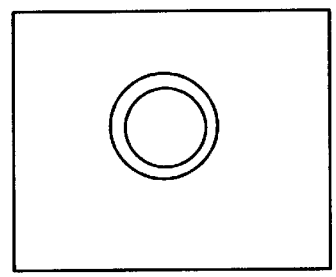
Figure 5A:
FIG. 5 is a view of a model of an actual object of interest according to one embodiment of the present invention.
Figure 5B:
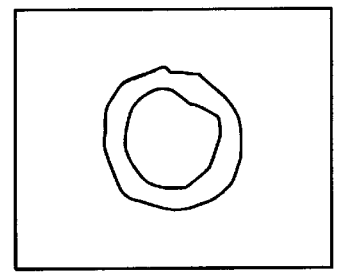

The creation and processing of a predefined synthetic model 32 based on the expected shape of the object of interest 21 will now be discussed, with reference to FIG. 3. Alternative predefined synthetic models are shown in FIGS. 4 and 5, and will be discussed below. The illustrative predefined synthetic model 32 FIG. 3 is a truncated cone structure (frustum) which generally resembles the object of interest 21, such as solder balls. The predefined synthetic model 32 is similar in three dimensional size and shape of the expected solder balls.

The predefined synthetic model 32 includes an upper surface 38 which is uniformly flat when viewed by the image acquisition device 24, as shown by arrows 36. For purposes of explanation, the X and Y axes (length and width) are shown in FIG. 3B, and the Z axis (height) is shown in FIG. 3A. The predefined synthetic model 32 also includes a lower surface 39, which is defined to be flush with a surface 34. The surface 34 is the surface that the object of interest 21 projects above (in the Z axis). The upper surface 38 and lower surface 39 respectively form an inner diameter and outer diameter which, when connected by a side 40, define the 3D truncated cone of the predefined synthetic model 32. A truncated cone structure (frustum) can be described by the equation $Z(x,y)=\max(0, \min(A+Br, z_{max}))$ where A and B define the slope of the cone, and r equals the distance from (x,y) to the center of the circle.

Alternatively, real data taken from sample objects may be obtained and used for predefined synthetic model 32. For example, a user can "train" the system by pointing a 3D image acquisition device 24 at an object of interest 21, and instructing the system to create a predefined synthetic model 32 based on the real data, for example as shown in FIG. 5. The user can make adjustments to the predefined synthetic model 32 and test the system's ability to locate objects. Also, as described below, weighted areas may be automatically or manually added to improve recognition.

In the illustrative embodiment, the predefined synthetic model 32 includes weighted areas. Weighted areas are parts of the predefined synthetic model 32 which are not considered, or are considered to a lesser extent, during the search of the 3D captured image data 26. As an example, weighted areas can be set to a "don't care" value, wherein any value in the data point being examined in the 3D captured image data 26 will match the predefined synthetic model 32. Weighted areas are typically areas where noise and errors in the 3D captured image data 26 are expected.

An example of a weighted area in the predefined synthetic model 32 is the sloped side 40 as shown in FIGS. 3A and 3B. For some 3D acquisition devices, since the slope of the side 40 is at a severe angle to the direction of scanning by the image acquisition device 24 (as shown by arrow 36), any 3D image data points along such severe angles are highly error-prone. The 3D captured image data will be noisy, or include many incorrectly measured points in such an area.

Taking this into account, the ring defined by the side 40 as shown in FIG. 3B is demarcated as a weighted area, with a weight value set very low, possibly to zero. When the predefined synthetic model 32 is compared to the data points in the 3D captured image data 26, the data points which would correspond to the weighted area of the predefined synthetic model 32 are not considered, or alternatively considered to a lesser extent than non-weighted areas.

The weighted areas of the predefined synthetic model 32 may be manually determined by a user defining a predefined synthetic model 32 for the system, or weighted areas may be determined automatically. For the above example where a slope angle of the side 40 is severe compared to the location of scanning 36, the following formula can be used to automatically determine zero weighted (don't care) areas, where s is the equation of the surface, z is the direction from the surface pointed towards the 3D image acquisition device 24, and the normal slope to the surface s is determined by:

$$\left(\frac{\partial s}{\partial x} \frac{\partial s}{\partial y} \frac{\partial s}{\partial z}\right) \cdot (0, 0, 1) = \frac{\partial s}{\partial z} < \text{Threshold}$$

Here, the dot product of a 3D vector matrix describing a 3D vector 42 perpendicular to a point 44 on the surface of the predefined synthetic model 32, and a 3D vector pointing in the direction of the image acquisition sensor (0,0,1), is taken. The resultant Z derivative ($\partial s/\partial z$) is compared to a predetermined threshold value. If the Z derivative is less than the predetermined threshold value, then the point 44 is determined to be, or weighted as a "don't care" point. In the present example, since all the points on the side 40 of the predefined synthetic model 32 will have the same slope and the same Z derivative (irrespective of X and Y components), all of the data points within the side 40 will be a weighted "don't care" area.

This approach for predicting weight as a function of surface normal is intended to predict the merit scores which will be observed using a particular 3D sensor. Alternatively, other 3D sensor or image acquisition device merit scores may be more correlated to surface roughness, albedo or other characteristics, and in those cases the model's weights would be computed to predict those merit scores.

If a predefined synthetic model 32 was a more complex shape, such as the ellipsoid model shown in FIG. 4, the points along the surface whose slope angle are below the predetermined threshold value will be determined to be "don't care" points, and the points whose slope angle are at or above the threshold value will be valid. Therefore, the formula works independently of the shape of the predefined synthetic model 32. An advantage of this is that users can define any type of predefined synthetic model 32, including using captured image data of real objects 21, which produce models such as shown in FIG. 5 as previously described. The above formula will properly exclude all data points and areas on the surface of the predefined synthetic model 32 which would produce excessive errors by the image acquisition device 24. Alternatively, the merit scores of the scanned feature can be used for weights.

The threshold value is determined based on the requirements for the system as well as limitations in the image acquisition device 24. For example, a higher threshold would result in more area of a predefined synthetic model 32 being considered "don't care", which would be useful in a high noise environment, or if the image acquisition device 24 produces a high level of erroneous readings. This makes the system more forgiving for errors and noise in the 3D captured image data 26. Also, since less data points are processed when the comparison is performed, the system may also run faster. Alternatively, a lower threshold value would result in more or all data points on a predefined synthetic model 32 being considered, which would make the system perform more detailed analysis during the search for the objects of interest 21 in the 3D captured image data 26.

In the illustrative embodiment, the predefined synthetic model 32 is represented by a matrix model 60, FIG. 6, including height data for each point within the matrix model 60. A corresponding correlation weights mask 62 FIG. 7 indicates the weights for each point. In the present example, the weights for each point are set to either 0 (zero) or 1 (one). A weight of zero indicates a "don't care" point, and the corresponding data point in 3D captured image data 26 will not be considered when compared to the matrix model 60. In a preferred embodiment, a weight of zero saves on processing, since calculations need not be performed in analyzing that data point. Specialized hardware is available to perform this operation when zero weights are used.

With the predefined synthetic model 32 and weighted areas prepared, the system scans the 3D captured image data 26 searching for the objects of interest 21 by comparing one or more predefined synthetic models 32 (in a form for example similar to matrix model 60, FIG. 6 and a corresponding correlation weights mask 62 FIG. 7) to the 3D captured image data 26. The comparison process is performed using weighted normalized correlation. Normalized correlation measures the 3D geometric similarity between an image portion and the predefined synthetic model 32 independent of any linear differences between the two. In other words, uniform changes between the image portion and the predefined synthetic model 32 are ignored. For example, if the image portion and the predefined synthetic model 32 differ in size by a constant value, then the system will determine a match. As another example, if the scanned object is tilted, most data points in that image portion of the 3D captured image data 26 will indicate a constant angle off center when compared to the predefined synthetic model 32. For most tilts, the system will properly recognize the object of interest 21.

For doing weighted normalized correlation, the illustrative embodiment uses the following formula for calculating the correlation coefficient r of a model and a corresponding portion of an image at an offset (u, v), where $w_i$ is the weight derived from the sensor's merit score(x,y), the model's weight(x,y), or the product of the sensor's merit score(x,y), and the model's weight(x,y). $I_i$ is the height data pixel at (u+$x_i$, v+$y_i$); and $M_i$ is the corresponding model pixel at the relative offset ($x_i$, $y_i$):

$$r(u, v) = \frac{\left[\sum w_i \sum_i w_i I_i M_i - \left(\sum_i w_i I_i\right)\left(\sum_i w_i M_i\right)\right]}{\sqrt{\left[\sum w_i \sum_i w_i I_i^2 - \left(\sum_i w_i I_i\right)^2\right]\left[\sum w_i \sum_i w_i M_i^2 - \left(\sum_i w_i M_i\right)^2\right]}}$$

Although weighted normalized correlation is shown for the illustrative embodiment, other forms of correlation are within the scope of the present invention, including non-weighted normalized correlation, regular correlation, weighted regular correlation, sums of absolute differences, and weighted sums of absolute differences.

Figure 8:
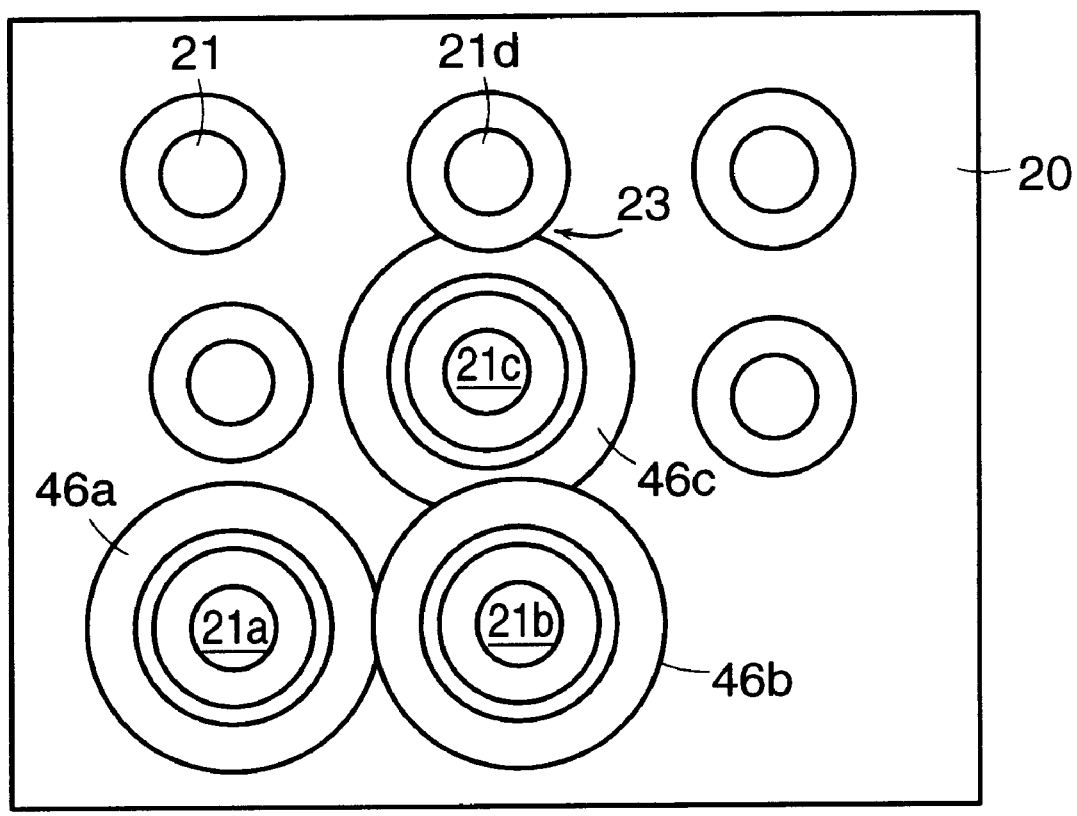
FIG. 8 is a view of an object surface for image analysis showing how surface points are selected according to the present invention.

Another feature according to one embodiment of the present invention includes the ability to determine a surface plane of inspection device 20, FIG. 8. As previously mentioned, analysis of the scanned inspection device 20 and detection of objects of interest 21 may take place on surfaces and components which are not positioned perfectly flat with respect to image acquisition device 24. Further, component inspection may require detection of warped surfaces, warped parts, improperly positioned parts, or extra material on a surface.

To determine a surface plane, a predefined area surrounding objects of interest 21 is selected. Sample data points are then taken from that predefined area. For example, as shown in FIG. 8, data points located in a ring 46 defined by a first radius and second larger radius from the center of a located object of interest 21, are selected. The first radius is chosen to be far enough away from the object of interest 21 so that the data points outside of the first radius will not include any portion of that object 21. The second radius is chosen to be close enough to the object of interest 21 to avoid areas of the surface of the inspection device 20 which might contain data points which don't define the surface, such as edges, or other components.

The predefined area 46 may overlap, as shown by 46b and 46c. Further, specific data points in predefined areas 46 may also be deselected, for example if a predefined area overlaps another object of interest, as shown by arrow 23 with regard to predefined area 46c. The predefined area 46c overlaps object 21d, therefore the data points overlapping on object 21d will be ignored.

Other considerations for the size of the predefined areas 46 include limiting the number of data points to consider when determining the surface plane. By limiting the size of the predefined areas 46, fewer data points will be processed, which will result in faster processing. Larger size for predefined areas 46 will result in higher accuracy.

Once the predefined areas 46 are selected, the system determines where the data points are, based upon the determined location of the objects of interest 21 in the 3D captured image data 32. These data points are then selected from the 3D captured image data 32, and processed to determine a 3D plane which fits all, or a best approximation of all the selected data points.

The surface plane is not limited to a geometric plane. A complex surface, for example a quadric surface which can be described by a polynomial equation, can be determined using the present invention.

In the illustrative embodiment, the surface plane (or ground plane) 78 is determined by computing the least squares fit between a plane and a set of points 112. The plane is fit to a point set by computing the inertia matrix of the point set (after subtracting out the average point so that the point set has an average position (0,0,0), and then computing the moments of inertia of that point set. The axis with the least inertia will correspond to the direction of the eigenvector corresponding to the smallest eigenvalue. For the equation presented below, x, y, and z correspond to the zero-mean point sets ($x-x_{mean}$, $y-y_{mean}$, $z-z_{mean}$):

$$\text{eigendecomposition} \begin{vmatrix} \sum x^2 & \sum xy & \sum xz \\ \sum xy & \sum y^2 & \sum yz \\ \sum xz & \sum yz & \sum z^2 \end{vmatrix}$$

For more complicated base representations (quadric surfaces), a least squares formula may be used. This method involves minimizing $f(x,y)^2$. For example, fitting a second order surface to the data set involves finding a, b, c, d, e, f which minimizes $\Sigma(z-f(x,y))^2$ where $f(x,y)=a*x*x+b*x*y+c*y*y+d*x+e*y+f$.

Figure 9:
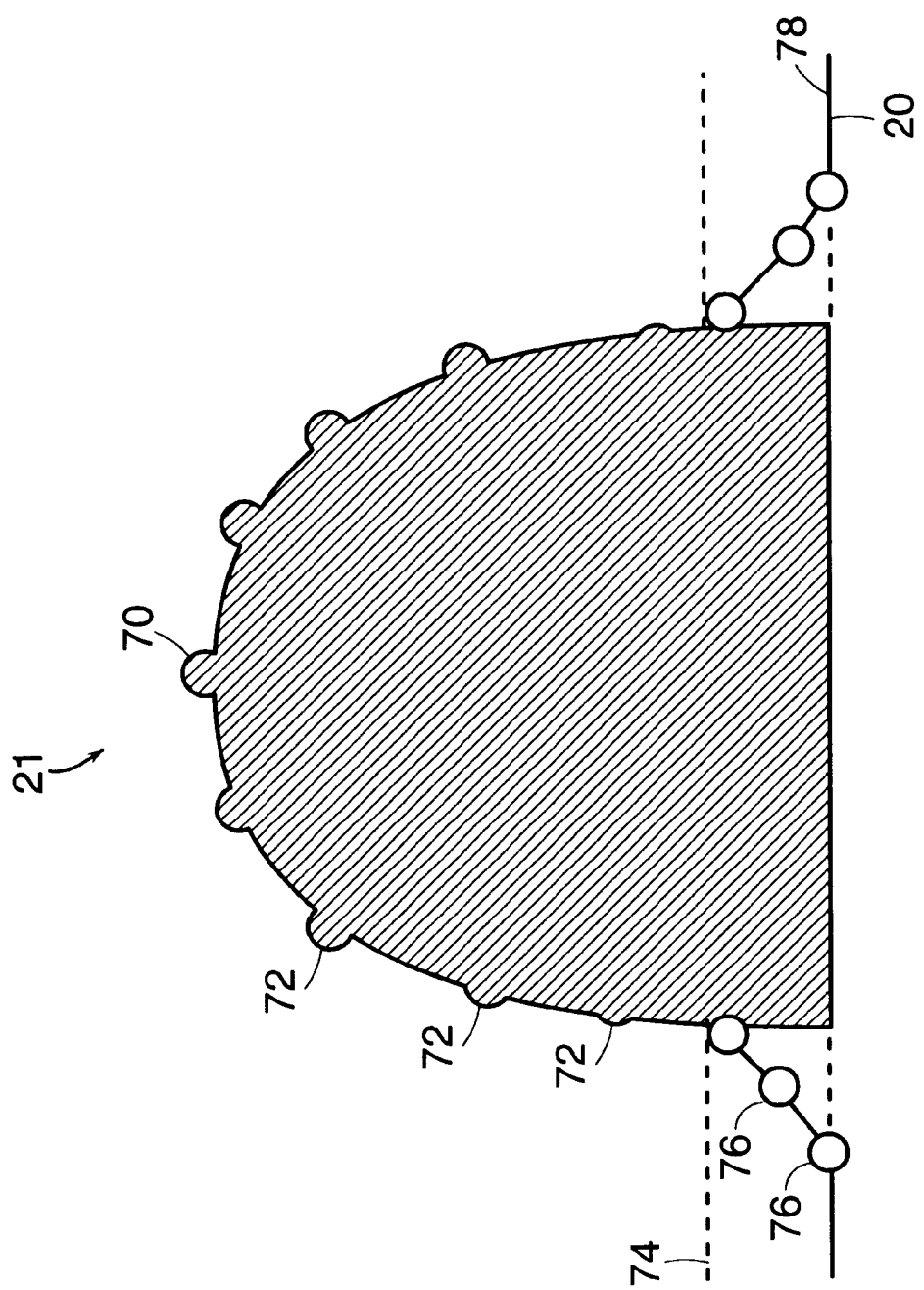
FIG. 9 is a view of an object surface showing how surface data points are used for object analysis in accord with the present invention.

Once the ground plane 78 has been estimated, the illustrative embodiment can measure the height, volume, and/or center of the mass by using the height differences between the measured height(x,y) and the predicted ground plane position(x,y). A nominal threshold 74 FIG. 9 above the ground plane 78 can also be used to determine which height pixels correspond to the feature (for example, if height(x,y)> ground_plane(x,y)+ threshold), and therefore should be accumulated into the sums. In addition, the height volume's incorporation into the sum statistics can be scaled by an adjusted weight using the model's weight(x,y), the sensor's merit score(x,y), or the product of both.

As an example, calculations are performed once an object 21 has been detected, once the surface plane 78 has been determined and the original data points 72, 76 in local neighborhoods (windows) at the template location of the object/feature 21 have been detected. For the embodiment including objects such as solder balls, within each window the data points are classified as either "ball" data points 72 or "non-ball" data points 76 depending on the distance from the data points to the surface plane 78. Data points which are noisy (out of range) or in a weighted "don't care" area, or have low merit scores may be ignored. The data points are classified as "ball" data points 72 if the distance from the data point 72 to the surface plane 78 exceeds the threshold level 74 as specified in the ball model 32.

Next, statistics about each solder ball are computed by focusing solely on the "ball" data points 72. Using these data points 72, computations including exposed ball volume, exposed center of mass, and max height 70 above the surface plane 78 are performed. The center of mass can be projected onto the substrate plane in order to compute the solder ball's (x,y) position on the device 20.

The data point data is expected to be calibrated in terms of the Z direction (for example the data point Z is calibrated to absolute Z), but the non-telecentricity of the lens of a 3D image capture device 24 may produce an (x,y) translation error which is a function of Z. The first order effect of this non-telecentricity is that (x,y) compensation must be performed at the found object 21 positions. The second order effect of this non-telecentricity is that the data points are not rectangular, but typically frustums, and therefore volume may need to be computed more precisely. Calibration for this includes (x,y) translational shifts as a function of Z height, which may be performed automatically.

Figure 10:
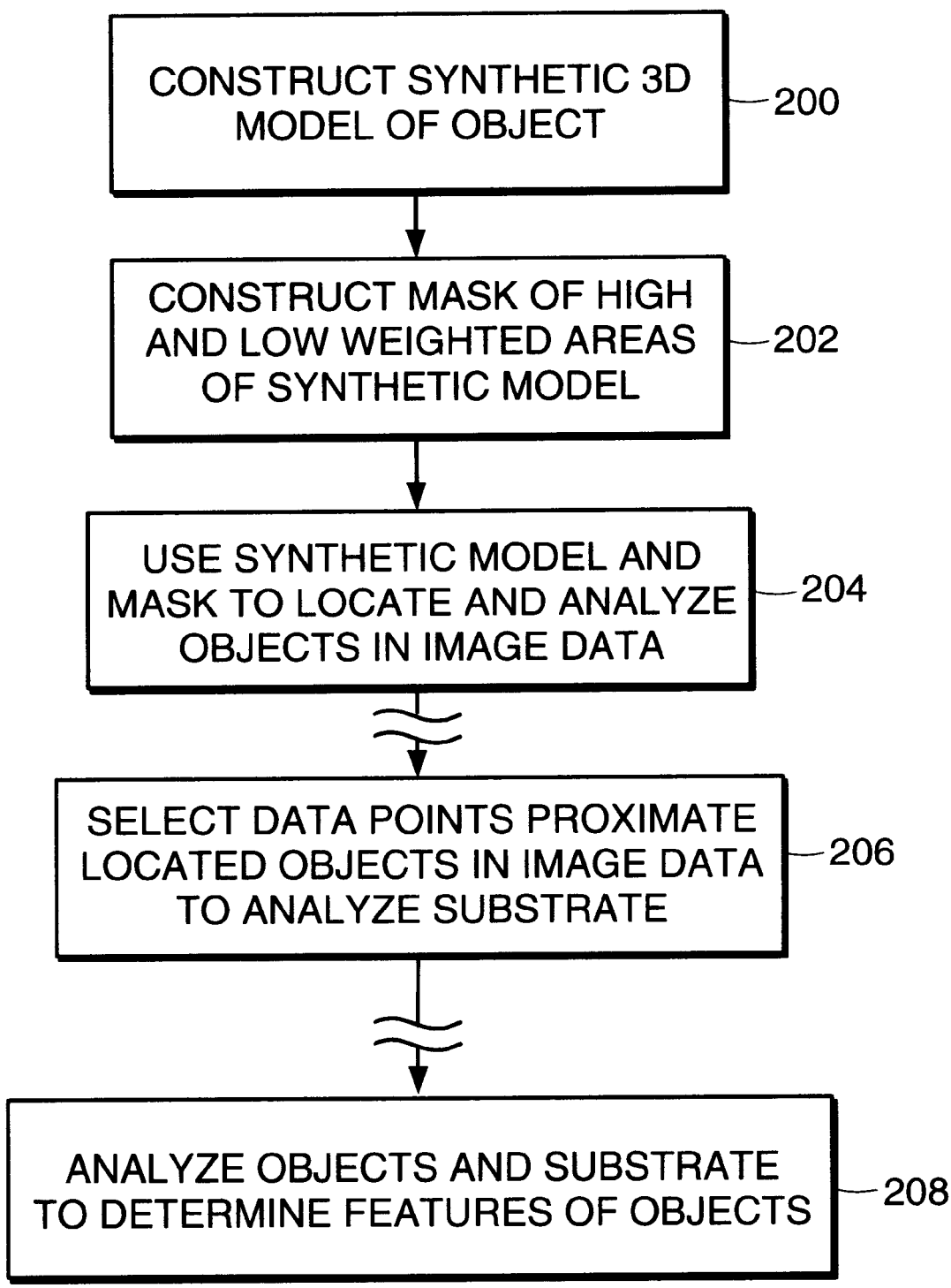
FIG. 10 is a flowchart showing steps performed according to the present invention.

A method for performing steps according to the present invention is shown in FIG. 10. The predefined synthetic model 32 is constructed, step 200. This is often referred to as "training" the system. As previously described, a user can define geometric models, or use actual data from scanned sample objects of interest 21, to define the predefined synthetic model 32. In the preferred embodiment, predefined synthetic models 32 are supplied with the system, although a user is provided with tools to help define any model they wish.

A mask defining weighted "don't care" areas or regions is created next, step 202. It is not necessary for the system to include weighted areas. Alternatively, several weighted areas are possible, each of the weighted areas having a different weighted value defining how important that area is to be considered in searching for the objects of interest 21. As previously described, the weighted areas may be determined automatically, based on the geometry of the predefined synthetic model 32.

The predefined synthetic model 32 and mask are used by the system to scan the 3D captured image data 26 to locate objects of interest 21. Once the objects of interest 21 are located, this information may be output to a user, stored in memory, or used in further processing, such as coplanarity measurement, quality assurance analysis, defective part detection, or counting, etc. As an example with solder balls, the located solder balls in the 3D captured image data 26 can then be analyzed to determine if they are sufficiently sized and properly spherical to form electrical connections when the BGA is mounted on a surface such as a PCB (printed circuit board). This analysis includes analyzing the solder volume to determine if the solder balls are sufficiently sized to form electrical connections; analyzing the center of mass to determine if the solder balls are appropriately positioned to form electrical connections; and analyzing the average height of the centers of the solder balls in the 3D captured image to determine complanarity so that the device will mount properly. A plane can be fit to the solder ball's top points using the method previously described, and then comparing the balls' position with respect to that top plane. Alternatively, the ball heights, center of masses etc. can be considered with respect to the lower (BGA surface) fitted plane. As another example, further processing including Golden Template Comparison can be performed.

An optional step 206 includes selecting data points proximate the located objects of interest 21 in the 3D captured image data. These selected data points are then analyzed to determine features of the surface of the inspection device 20, separate from any objects of interest 21 on the scanned inspection device 20. As an example with BGAs, the data points define the surface of the BGA, and can indicate if the BGA is lying flat, or at some angle, and further whether the BGA is bent or warped. Further analysis which depends on knowing the surface plane of the inspection device can also be performed, including scanning the known surface for foreign objects including dust or misplaced solder or rosin.

An optional final step 208 includes analysis of the objects and plane substrate, as previously discussed.

The present invention is implemented in C and C++ code and runs on any general purpose computer system, including microprocessor based personal computers. The present invention could also be implemented in other software and/or dedicated hardware such as ASICs, or other specialized hardware.

Although described in terms of analysis of manufactured objects, the present invention can be used in any situation where 3D image data must be analyzed to recognize predetermined objects, including data from radar or sonar systems, or any distance or depth measuring devices. Further, as previously mentioned, other types of correlation analysis can be performed, including regular correlation.

Although the invention has been shown and described with respect to an exemplary embodiment thereof, various other changes, omissions and additions in the form and detail thereof may be made therein without departing from the spirit and scope of the invention.

What is claimed is:

1. In a system for analyzing 3D image data obtained by a 3D imaging system, a method for locating objects of interest in said 3D image data comprising:

defining a 3D model of at least one object of interest which includes at least one weighted area indicating an area of said 3D model wherein a match to corresponding areas in said 3D image data is not of interest;

comparing said 3D model to said 3D image data using normalized correlation; and providing an indication if said 3D model substantially matches part of said 3D image data.

2. The method of claim 1 wherein said 3D image data includes a plurality of data points, and corresponding merit score data provided by said 3D imaging system, said merit score data providing an indication of a confidence in validity in each of said corresponding data points.

3. The method of claim 2 wherein said at least one weighted area is determined to correspond to areas of said 3D model, which, when compared to said 3D image data, will correspond to data points in said 3D image data with low corresponding merit scores.

4. The method of claim 1 wherein said step of comparing said 3D model to said 3D image data uses weighted normalized correlation.

5. In a system for analyzing 3D image data obtained by a 3D imaging system, a method for locating objects of interest in said 3D image data comprising:

defining a 3D model of at least one object of interest;

defining at least one weighted area of said 3D model, said weighted area indicating an area of said 3D model wherein a match to a corresponding area in said 3D image data is not of interest;

comparing said 3D model to said 3D image data; and providing an indication if said 3D model matches part of said 3D image data.

6. The method of claim 5 wherein said step of comparing said 3D model to said 3D image data includes performing normalized correlation.

7. The method of claim 5 wherein said step of comparing said 3D model to said 3D image data includes performing weighted normalized correlation.

8. The method of claim 5 wherein said step of comparing said 3D model to said 3D image data includes performing regular correlation.

9. The method of claim 5 wherein said at least one weighted area of said 3D model indicates an area of said 3D model wherein any match to corresponding areas in said 3D image data is unnecessary.

10. The method of claim 5 wherein a shape of said 3D model includes a frustum (truncated cone).

11. The method of claim 5 wherein said step of defining a 3D model includes defining a 3D model by processing 3D image data of at least one of said objects of interest.

12. The method of claim 5 wherein said step of defining at least one weighted area of said 3D model includes determining areas of said 3D model which, when compared to said 3D image data, are likely to correspond to parts of said 3D image data which contain erroneous data.

13. The method of claim 5 wherein said step of providing an indication if said 3D model matches part of said 3D image data includes providing a location of said matched object of interest in said 3D image data.

14. The method of claim 13 further including the steps of:

selecting data in said 3D image data that is a predetermined distance away from said location of said matched object of interest in said 3D image data; and processing said selected data to determine a surface plane which includes a pre-determined portion of said selected data.

15. The method of claim 14 wherein said at least one object of interest includes solder balls to be located and analyzed on the surface of an electrical component, said electrical component being scanned by a 3D image acquisition device to produce said 3D image data.

16. The method of claim 15 wherein said step of processing said selected data to determine a surface plane includes determining a surface of said electrical component.

17. The method of claim 15 further including the step of:

analyzing said located solder balls to determine properties of said solder balls.

18. The method of claim 17 wherein said properties of said solder balls to be determined are selected from the group of: height, volume, shape, center of mass and coplanarity.

19. The method of claim 14 wherein said step of selecting data in said 3D image data that is a predetermined distance away from said location of said matched object of interest in said 3D image data is performed for a plurality of matched objects in said 3D image data.

20. The method of claim 19 wherein said step of processing said selected data to determine a surface plane includes computing a least square fit on said selected data.

21. A computer system for locating and analyzing objects of interest in 3D image data comprising:

a memory storing said 3D image data; and a processor comparing a 3D model of a predetermined object of interest to said 3D image data stored in said memory; said 3D model including at least one weighted area, said at least one weighted area indicating an area of said 3D model wherein a match to said 3D image data is not of interest, wherein said processor provides an indication if said 3D model matches a part of said 3D image data.

22. The system of claim 21, wherein said processor compares said 3D model to said 3D image data using weighted normalized correlation.

23. The system of claim 21, wherein a shape of said 3D model of a predetermined object of interest includes a frustum (truncated cone).

24. The system of claim 21 wherein said 3D model is created by locating a predetermined object of interest in captured 3D image data, and processing said captured 3D image data including said predetermined object of interest to produce said 3D model.

25. The system of claim 21 wherein said at least one weighted area of said 3D model includes areas of said 3D model which, when compared to said 3D image data, are likely to correspond to parts of said image data which contain erroneous data.

26. The system of claim 21 wherein said processor, upon locating at least one predetermined object of interest in said 3D image data, selects data in said 3D image data that is a predetermined distance away from said located at least one predetermined object of interest, and determines a surface plane which includes a predetermined portion of said selected data.

27. The system of claim 26 wherein said surface plane includes a complex quadric surface.

* * * * *